United States Patent

[11] 3,624,062

| [72] | Inventor | Joseph E. Dunbar<br>Midland, Mich. |
|---|---|---|
| [21] | Appl. No. | 881,285 |
| [22] | Filed | Dec. 1, 1969 |
| [45] | Patented | Nov. 30, 1971 |
| [73] | Assignee | The Dow Chemical Company<br>Midland, Mich. |

[54] PHENOXARSINYL ETHERS OF POLYMERIC POLYHYDROXY COMPOUNDS AND PREPARATION
20 Claims, No Drawings

[52] U.S. Cl. .................................................. 260/91.3 VA,
117/138.5 C, 260/212, 260/231 A, 260/231
R, 260/231 CM, 260/233.3 R, 424/297
[51] Int. Cl. .................................................. C08f 3/34
[50] Field of Search ........................................... 424/297;
117/138.5; 260/91.3 VA, 231 A, 231 CM, 231 R,
233.3 R, 212

[56] References Cited
UNITED STATES PATENTS

| 2,637,661 | 5/1953 | Benignus | 117/138.5 |
| 3,069,252 | 12/1962 | Josephs et al. | 424/297 |
| 3,105,060 | 9/1963 | Schramm et al. | 424/297 |
| 3,212,842 | 10/1965 | Burkitt | 260/91.3 |
| 3,226,380 | 12/1965 | Knight | 260/91.3 |
| 3,228,830 | 1/1966 | McFadden et al. | 427/297 |
| 3,288,674 | 11/1966 | Yeager | 427/297 |
| 3,390,008 | 6/1968 | Giller et al. | 117/138.5 |
| 3,498,829 | 3/1970 | Lifland et al. | 117/138.5 |

OTHER REFERENCES

Chemical Abstracts, Vol. 62, No. 4, 2/15/65, pp. 4,366 b

*Primary Examiner*—Donald E. Czaja
*Assistant Examiner*—Ronald W. Griffin
*Attorneys*—Griswold & Burdick, Theodore Post and John L. Spalding ABSTRACT: Polymeric polyhydroxy compounds, e.g., cellulose, starch, cellulose loweralkyl ethers, cellulose lowerhydroxyalkyl ethers, cellulose loweralkyl lowerhydroxyalkyl mixed ethers, carboxymethylcellulose and its water-soluble salts and polyvinyl alcohol are reacted with 10,10'-oxybisphenoxarsine to provide corresponding 10-phenoxarsinyl ether derivatives. The 10-phenoxarsinyl ether derivatives exhibit antimicrobial properties.

PHENOXARSINYL ETHERS OF POLYMERIC POLYHYDROXY COMPOUNDS AND PREPARATION

SUMMARY OF THE INVENTION

The present invention is directed to 10phenoxarsinyl ethers of polymeric polyhydroxy compounds originally having from one to three reactive hydroxyl groups per mer unit, i.e., cellulose in its various forms, e.g., wood pulp, cotton linters or fiber, cotton rags, etc.; cellulose loweralkyl ethers, e.g., methyl-, ethyl-, propyl- and mixed loweralkyl ethers; lowerhydroxyalkyl ethers, e.g., hydroxyethyl, hydroxpropyl and mixed lowerhydroxyalkyl ethers or mixed loweralkyl lowerhydroxyalkyl ethers, e.g., methyl hydroxyethyl ethers; starch both water-soluble and water-insolube types; carboxymethyl cellulose and its alkali metal salts; and polyvinyl alcohol. With cellulose and its derivatives, the mer unit is a β-glucose unit; with starches, the mer unit is an α-glucose unit; while with polyvinyl alcohol, the mer unit is a vinyl alcohoi unit.

The compounds of the present invention are solids and possess varying degrees of solubility in water and organic hydrocarbon solvents. These compounds have microbiocidal properties and inhibit the growth of many bacteria and fungi.

The novel 10phenoxarsinyl ethers are prepared by bringing together the desired polymeric polyhydroxy compound and 10,10′-oxybisphenoxarsine (hereinafter "oxybis") at a waterlibertaing temperature according to the following equation:

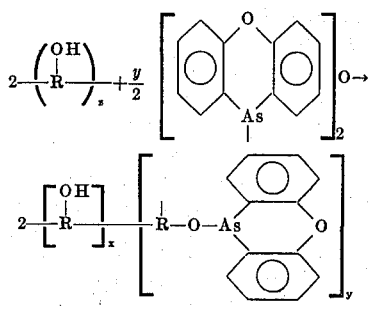

to obtain the desired phenoxarsinyl ether and water of reaction. In the equation, —R(OH)— represents a mer unit, e.g., a β-glucose unit in cellulose, having reactive hydroxyl groups and $X+y=z$. The choice of hydroxyl groups involved in the formation of 10-phenoxarsinyl ether groups is believed to be essentially statistical and to involve two hydroxyl groups opposite each other on parallel polymer chains, while the amount of 10-phenoxarsinyl ether formation will depend upon the availability of the hydroxyl moieties. The reaction is conveniently carried out in the presence of an inert organic liquid as reaction medium, for example, benzene, toluene, xylene, methylcyclohexane, methyl ethyl ketone, hexane and pertoleum benzine having a distillation range of 35° to 80° C. The relative amounts of the reactants to be employed are not critical, some of the desired product being formed when contacting the reactants in an proportions. Thus, the oxybis can be employed in amounts equal to, less than or greater than the equivalent amount of available hydroxyl groups, dependent upon the degree of phenoxarsinyl ether substitution to be achieved. In the preferred procedure, a large excess up to ca. 2,000 times theoretical oxybis is employed. The reaction takes place at a temperature at which water of reaction is liberated, conveniently in the temperature rang from 60° to 120° C., but a range of from 70° to 95° C. is considered preferable from a practical standpoint, i.e., rate of reaction and convenience of operation.

In carrying out the reaction the oxybis and the polymeric polyhydroxy reactant are dispersed in the reaction medium and the reaction mixture is heated at the reaction temperature for a period of time sufficient to complete the reaction. In a preferred procedure, the reaction mixture is heated at the boiling temperature under atmospheric reflux. In a convenient procedure, the water of reaction is collected in a Dean-Stark trap beneath the reflux condenser. Following the reaction period, the 10-phenoxarsinyl ether product is recovered by conventional procedures such as decantation or filtration and extraction with a solvent for unreacted oxybis, for example, benzene. The purified product is then dried by evaporating the solvent. The products are identified by elemental analysis and, as to arsenic content, by X-ray fluorescence.

DETAILED DESCRIPTION OF THE INVENTION

The following examples describe completely representative specific embodiments and the best modes contemplated by the inventor of carrying out the invention.

EXAMPLE 1: PHENOXARSINYL CELLULOSE ETHER

Powdered cellulose, Solka Floc BW 100 wood pulp (50.0 grams) is added to a hot solution of oxybis (25.1 grams, 0.5 mole) in 500 ml. of benzene. The mixture is heated at the boiling temperature under atmospheric reflux for 45 minutes, water-of-reaction being removed as it forms as a benzene azeotrope. Following the reaction period, the reaction mixture is filtered while hot to obtain the phenoxarsinyl cellulose ether crude product as a cake. The crude product is successively washed with three 100 ml. portions of boiling benzene. Thereafter, the washed product is extracted continuously with benzene in a Soxhlet extractor for 16 hours to remove any additional unreacted oxybis. The purified product is then dried in vacuo at room temperature. Analysis of the dried phenoxarsinyl cellulose ether shows an arsenic content of 87 parts per million by weight, corresponding to one phenoxarsinyl group per 5,300 β-glucose units.

EXAMPLE 2: PHENOXARSINYL HYDROXYPROPYL METHYLCELLULOSE ETHER

Methocel 90 HG hydroxypropyl methylcellulose (50 grams, D.S. 1.08–1.42 methoxyl and 0.1–0.3 hydroxylisopropoxyl substitution) and oxybis (25.1 grams, 0.05 mole) are dispersed in 500 ml. of benzene. The mixture is heated at the boiling temperature under atmospheric reflux with stirring for 5 hours. The water of reaction and any residual water is collected in a trap beneath the reflux condenser. Following the heating period, the reaction mixture is cooled to room temperature and the mixture is filtered to collect the solid phenoxarsinyl hydroxypropyl methylcellulose ether as a crude product. This crude product is washed with benzene and finally extracted with benzene in a Soxhlet extractor for 96 hours. Thereafter, the purified product is dried. The phenoxarsinyl hydroxypropyl methylcellulose ether product is water soluble and has an arsenic content of 920 parts per million, equivalent to Ca one phenoxarsinyl group for every 430 β-glucose units in the cellulose chain.

EXAMPLE 3: PHENOXARSINYL METHYLCELLULOSE ETHER

To a hot solution of oxybis (25.1 grams, 0.05 mole) in 500 ml. of benzene is added 50.0 grams of powdered Methocel MC Premium methylcellulose (viscosity 400 c.p.s., D.S. 1.6–1.9 methoxyl substitution). Following the contacting of the reactants, the reaction mixture is kept at the boiling point under atmospheric reflux with stirring for 5 hours. Water-of-reaction is removed as a benzene azeotrope. Thereafter, the solid product is separated from the reaction mixture and extracted as described in example 2. Analysis of the phenoxarsinyl methylcellulose product gives an arsenic content of ca. 1,660 parts per million by weight, equivalent to one phenoxarsinyl group for every 240 β-glucose units in the cellulose chain.

EXAMPLE 4: PHENOXARSINYL CARBOXYMETHYLCELLULOSE ETHER

Powdered carboxymethylcellulose (40.0 grams, D.S. 0.7 carboxymethoxyl substitution) is added to a hot solution of oxybis (20.0 grams) in 500 ml. of benzene. The reaction mixture is heated at reaction temperature to completion of reaction, and the product is separated from the reaction mixture and purified, in the manner described in example 2. Analysis of the phenoxarsinyl carboxymethylcellulose product gives an arsenic content of 165 parts per million by weight, which corresponds to ca. one phenoxarsinyl group for each 2,238 $\beta$-glucose units in the cellulose chain.

EXAMPLE 5: PHENOXARSINYL HYDROXYETHYLCELLULOSE ETHER

Powdered Natrosol 250 Medium hydroxyethylcellulose (50.0 grams, D.S. 2.5 hydroxyethyl substitution) is added to a hot solution of oxybis (25.1 grams, 0.05 mole) in 500 ml. of benzene. The reaction mixture is reacted and the crude product is separated from the reaction mixture, extracted and dried as described in example 2. Analysis of the solid phenoxarsinyl hydroxyethylcellulose ether product gives an arsenic content of 845 parts per million by weight, corresponding to ca. one phenoxarsinyl group for every 324 $\beta$-glucose units in the cellulose chain.

EXAMPLE 6: PHENOXARSINYL COTTON DUCK ETHER

Cotton duck cloth (50 grams) is cut into 3 to 4 cm. squares and suspended in a solution of oxybis (25.1 grams, 0.05 mole)in mole)In 500 ml. of benzene. The solution containing the suspended cotton duck is maintained at the boiling temperature under atmospheric reflux with stirring for 23 hours. During the heating period, the residual water from the cotton duck and the water of reaction are collected in a trap located beneath the reflux condenser. Following the heating period, the hot benzene-oxybis solution is decanted from the pieces of cotton duck and the latter are extracted with benzene in a Soxhlet extractor for a total period of 44 hours. Following the extraction, the cotton duck is removed from the extractor and dried. Analysis of the dried phenoxarsinylated cotton duck gives an arsenic content of 840 parts per million, corresponding to ca. one phenoxarsinyl group for every 548 $\beta$-glucose units in the cellulose chain.

EXAMPLE 7: PHENOXARSINYL MATTRESS STARCH ETHER

A suspension of 50 g. of mattress starch in a solution of 25.0 grams of oxybis in 500 ml. of benzene is heated under reflux with stirring for 5 hours, water-of-reaction being removed as a benzene azeotrope. The phenoxarsinyl starch ether formed is then collected on a Buechner filter and washed with hot benzene followed by continuous extraction with benzene in a Soxhlet extractor for a period of 52 hours. The extracted mattress starch ether is then removed and air dried. X-ray fluorescence analysis corresponds to an arsenic content of 2,100 p.p.m., equivalent to ca. one phenoxarsinyl group per 218 $\alpha$-glucose units.

EXAMPLE 8: PHENOXARSINYL METHYLHYDROXYPROPYLCELLULOSE ETHER

To a stirred suspension of 97.1 grams (0.194 mole) of oxybis in 2 liters of benzene is added 193.5 grams of Methocel 90 HG methyl hydroxypropyl cellulose ether having a D.S. of 1.08–1.42 methoxyl and 0.1–0.3 hydroxy-propoxyl substitution. The mixture is heated under atmospheric reflux with stirring for 2.5 hours, while the water-of-reaction is collected in a Dean-Stark trap. The resulting phenoxarsinyl ether is then collected on a filter and extracted in a Soxhlet extractor with benzene for a period of 70 hours. The phenoxarsinyl cellulose ether is then dried in vacuo at room temperature. Analysis shows an arsenic content of 250 parts per million which is equivalent to ca. one phenoxarsinyl group to every 1,567 $\beta$-glucose units.

EXAMPLE 9: PHENOXARSINYL HYDROXYETHYLCELLULOSE ETHER

To a stirred suspension of 105.4 grams (0.211 mole of oxybis in 2 liters of benzene is added 210 grams of Natrosol 180 L hydroxyethylcellulose (D.S. 1.8 hydroxyethoxyl substitution). The mixture is heated under atmospheric reflux with stirring for 2 ½ hours, while the water-of-reaction is collected in a Dean-Stark trap. The phenoxarsinyl ether product is then collected on a filter and extracted with benzene in a Soxhlet extractor for 48 hours. The phenoxarsinyl ether is then dried in vacuo at room temperature. Analysis shows an arsenic content of 800 parts per million which is equivalent to ca. one phenoxarsinyl group to every 386 cellulose units.

EXAMPLE 10: PHENOXARSINYL HYDROXYETHYLCELLULOSE ETHER

To a stirred suspension of 100 grams (0.201 mole) of oxybis in 2 liters of benzene is added 200 grams of Natrosol 250 HR hydroxyethylcellulose ether (D.S. 2.5 hydroxyethyl substitution). The mixture is heated under atmospheric reflux with stirring for 2 hours, while the water-of-reaction is collected in a Dean-Stark trap. The phenoxarsinyl ether product is then collected on a filter and extracted with benzene in a Soxhlet extractor for a period of 48 hours. The phenoxarsinyl hydroxypropylcellulose ether is dried in vacuo at room temperature. Analysis shows an arsenic content of 250 parts per million which is equivalent to approximately one phenoxarsinyl group for every 1,100 $\beta$-glucose units.

EXAMPLE 11: PHENOXARSINYL METHYLHYDROXYPROPYLCELLULOSE ETHER

To a stirred suspension of 100 grams (0.201 mole) of oxybis in 2.3 liters of benzene is added 253 grams of Methocel J12HS methylhydroxypropylcellulose having a D.S. of 1.5–1.62 methoxyl and 0.17–0.25 hydroxypropoxyl substitution. The mixture is heated under reflux with stirring for 2 hours, water-of-reaction being removed as formed, and then poured into an evaporating dish where it is allowed to evaporate to dryness. The dry mixture is pulverized and extracted with nitromethane for 56 hours in Soxhlet extractors, removed from the thimbles and dried at room temperature. Analysis shows an arsenic content of 6,500 parts per million which is equivalent to ca. one phenoxarsinyl group for every 57 $\beta$-glucose units.

EXAMPLE 12: PHENOXARSINYL POLYVINYL ALCOHOL ETHER

A mixture of oxybis (50.2 g., 0.100 mole), Elvanol Grade 72–60 polyvinyl alcohol (8.8 g., 0.2 mole equivalent of OH) and 200 ml. of benzene is refluxed and the vapors distilled 37 hours through a Dean-Stark trap in order to remove water. The reaction mixture is then transferred to a Soxhlet thimble and the excess benzene-soluble oxybis is extracted 46 hours from the reaction product. The residual products, 7.9 g., is analyzed and found to contain 0.11 percent arsenic, equivalent to one phenoxarsinyl group per 1,542 vinyl alcohol units in the polyvinyl alcohol chain.

The phenoxarsinyl ethers of this invention are useful to control and kill fungi and bacteria in a variety of environments. These new compounds can be added to oil and latex paints, primers, adhesives, papers, fabrics, wood preservatives, carpet backing, mattresses, etc. and thereby prevent the discoloration, odor and degradation caused by the growth of micro-organisms therein.

The antimicrobial properties of the phenoxarsinyl ethers of polymeric polyhydric compounds are illustrated by representative operations wherein nutrient agar medium containing such a phenoxarsinyl ether at a concentration of 1,00 parts per million by weight is streaked with *Aspergillus terreus*, *Candida pelliculose* and *Pullularia pullulans* and the plates are then incubated at 30° C. for 72 hours. In such operations, the phenoxarsinyl hydroxypropyl methylcellulose ether of example 2, the phenoxarsinyl methylcellulose ether of example 3, the phenoxarsinyl hydroxyethylcellulose ether of example 5, the phenoxarsinyl hydroxypropyl methylcellulose ether of example 8, the phenoxarsinyl hydroxyethylcellulose ether of example 9 and the phenoxarsinyl methylhydroxypropylcellulose ether of e example 11 each completely inhibits growth of the above organisms. Check plates of the untreated solid nutrient agar inoculated with the test organisms and thereafter incubated for 72 hours at 30° C. show heavy growth of the test organisms. Proportionally higher concentrations are required when phenoxarsinyl ethers having a lower phenoxarsinyl content are used. Generally, phenoxarsinyl ethers having at least one phenoxarsinyl group per 10,000 mer units of polymer are desired for antimicrobial control.

What is claimed is: 1

1. Method for preparing the 10-phenoxarsinyl ether of a polymeric polyhydroxy compound having reactive hydroxyl groups which consists essentially in contacting said polymeric polyhydroxy compound, originally having from one to three reactive hydroxyl groups per mer unit, with 10,10'-oxybisphenoxarsine in the presence of an inert organic liquid reaction medium at a temperature at which water-of-reaction is liberated and recovering the 10-phenoxarsinyl ether from the reaction medium.

2. Method of claim 1 wherein the polymeric polyhydroxy compound is cellulose.

3. Method of claim 1 wherein the polymeric polyhydroxy compound is a loweralkyl ether of cellulose having reactive hydroxyl groups.

4. Method of claim 1 wherein the polymeric polyhydroxy compound is a lowerhydroxyalkyl ether of cellulose having reactive hydroxyl groups.

5. Method of claim 1 wherein the polymeric polyhydroxy compound is a loweralkyl lowerhydroxyalkyl mixed ether of cellulose having reactive hydroxyl groups.

6. Method of claim 1 wherein the polymeric polyhydroxy compound is carboxymethylcellulose or an alkali metal salt thereof having reactive hydroxyl groups.

7. Method of claim 1 wherein the polymeric polyhydroxy compound is polyvinyl alcohol.

8. The 10-phenoxarsinyl ether of a polymeric polyhydroxy compound having at least about one 10-phenoxarsinyl ether group per 10,000 mer units, said polymeric polyhydroxy compound originally having from one to three reactive hydroxyl groups per mer unit.

9. The product of claim 8 which is cellulose having about one 10-phenoxarsinyl ether group per 5,300 $\beta$-glucose units.

10. The product of claim 8 which is methyl hydroxypropylcellulose having a degree of substitution of 1.5–1.62 methoxyl and 0.17–0.25 hydroxylpropoxyl and about one 10-phenoxarsinyl ether group per 60 $\beta$-glucose units.

11. The product of claim 8 which is methyl hydroxypropylcellulose having a degree of substitution of 1.08–1.42 methoxyl and 0.1–0.3 hydroxypropoxyl and about one 10-phenoxarsinvyl ether group per 430 $\beta$-glucose units.

12. The product of claim 8 which is methyl hydroxypropylcellulose having a degree of substitution of 1.08–1.42 methoxyl and 0.1–0.3 hydroxypropoxyl and about one 10-phenoxarsinyl ether group per 1,570 $\beta$-glucose units.

13. The product of claim 8 which is hydroxyethylcellulose having a degree of substitution of 2.5 hydroxyethoxyl and about one 10-phenoxarsinyl ether group per 320 $\beta$-glucose units.

14. The product of claim 8 which is hydroxyethylcellulose having a degree of substitution of 2.5 hydroxyethoxyl and about one 10-phenoxarsinyl ether group per 1,100 $\beta$-glucose units.

15. The product of claim 8 which is hydroxyethylcellulose having a degree of substitution of 1.8 hydroxyethoxyl and about one 10-phenoxarsinyl ether group per 390 $\beta$-glucose units.

16. The product of claim 8 which is methylcellulose having a degree of substitution of 1.6–1.9 methoxyl and about one 10-phenoxarsinyl ether group per 240 $\beta$-glucose units.

17 The product of claim 8 which is carboxymethylcellulose having a degree of substitution of 0.7 carboxymethyl and about one 10-phenoxarsinyl ether group per 2,140 $\beta$-glucose units.

18. The product of claim 8 which is cotton duck cloth having about one 10-phenoxarsinyl ether group per 550 $\beta$-glucose units.

19 The product of claim 8 which is starch having about one 10-phenoxarsinyl ether group per 220 $\alpha$-glucose units.

20 The product of claim 8 which is polyvinyl alcohol having about one 10-phenoxarsinyl ether group per 1,540 vinyl alcohol units.

* * * * *

PO-1050
(5/69)

UNITED STATES PATENT OFFICE
CERTIFICATE OF CORRECTION

Patent No. 3,624,062                     Dated November 30, 1971

Inventor(s) Joseph E. Dunbar

It is certified that error appears in the above-identified patent and that said Letters Patent are hereby corrected as shown below:

Column 1, line 60, delete "an" and insert to read -- any --.

line 67, delete "rang" and insert to read -- range --.

Column 3, line 25, delete "in mole)".

Column 5, line 3, delete "e".

Column 6, Claim 17, line 32, change "2,140" to read -- 2,240 --.

Signed and sealed this 28th day of November 1972.

(SEAL)
Attest:

EDWARD M. FLETCHER, JR.                  ROBERT GOTTSCHALK
Attesting Officer                            Commissioner of Patents